United States Patent
Inazawa et al.

(10) Patent No.: US 11,509,810 B2
(45) Date of Patent: Nov. 22, 2022

(54) IMAGE CAPTURE APPARATUS, OPERATION APPARATUS AND CONTROL METHODS

(71) Applicant: CANON KABUSHIKI KAISHA, Tokyo (JP)

(72) Inventors: Keisuke Inazawa, Tokyo (JP); Tomohiro Ota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/587,071

(22) Filed: Jan. 28, 2022

(65) Prior Publication Data
US 2022/0247917 A1 Aug. 4, 2022

(30) Foreign Application Priority Data

Feb. 4, 2021 (JP) .............................. JP2021-016890

(51) Int. Cl.
H04N 5/232 (2006.01)
(52) U.S. Cl.
CPC ..... H04N 5/23203 (2013.01); H04N 5/23216 (2013.01); H04N 5/232933 (2018.08); H04N 5/232939 (2018.08)
(58) Field of Classification Search
CPC ......... H04N 5/23203; H04N 5/232939; H04N 5/232933; H04N 5/23216; H04N 5/23245; H04N 5/232061; H04N 5/91; H04N 5/772; H04N 5/232125; H04N 5/765; H04L 67/125; G06F 21/608; G06F 21/74; H04W 4/70; H04W 4/80; G11B 27/034; G11B 27/105

(Continued)

(56) References Cited

U.S. PATENT DOCUMENTS 8,466,968 B2 * 6/2013 Takagi ............. H04N 5/232933
348/207.1
10,397,870 B2 * 8/2019 Shimosato ........... H04B 7/2612
(Continued)

FOREIGN PATENT DOCUMENTS

JP 2016-100828 A 5/2016

OTHER PUBLICATIONS

The above references were cited in a Jul. 4, 2022 Great Britain Search Report, which is enclosed,that issuer in British Patent Application No. 2200216.6.

*Primary Examiner* — Pritham D Prabhakher
(74) *Attorney, Agent, or Firm* — Cowan, Liebowitz & Latman, P.C.

(57) ABSTRACT

An image capture apparatus which can be remotely controlled by an external apparatus. The image capture apparatus communicates with the external apparatus, generates a first operation screen which displays first information relating to the image capture apparatus and which includes a captured image, generates a second operation screen which is different from the first operation screen and displays second information relating to the image capture apparatus and does not include the captured image, and controls the image capture apparatus based on the operation request for the image capture apparatus received from the external apparatus. The image capture apparatus selectively transmits the first operation screen or the second operation screen to the external apparatus based on an instruction from the external apparatus.

14 Claims, 12 Drawing Sheets

(58) Field of Classification Search
USPC .................................................. 348/211.8
See application file for complete search history.

(56) References Cited

U.S. PATENT DOCUMENTS

| | | | |
|---|---|---|---|
| 10,455,132 B2* | 10/2019 | Ota | H04N 5/23216 |
| 10,827,109 B2* | 11/2020 | Ohgishi | H04N 5/232411 |
| 11,265,453 B2* | 3/2022 | Kikuchi | H04N 5/232411 |
| 2006/0203097 A1* | 9/2006 | Koga | H04N 5/23203 |
| | | | 348/211.3 |
| 2010/0283868 A1 | 11/2010 | Clark et al. | |
| 2011/0037865 A1* | 2/2011 | Takagi | H04N 5/232933 |
| | | | 348/E5.042 |
| 2011/0122270 A1* | 5/2011 | Takagi | H04N 5/232933 |
| | | | 348/E5.042 |
| 2014/0073244 A1* | 3/2014 | Ko | H04L 69/14 |
| | | | 455/41.1 |
| 2015/0189150 A1* | 7/2015 | Morisawa | H04N 21/41265 |
| | | | 348/211.8 |
| 2017/0310896 A1* | 10/2017 | Harada | H04N 5/23241 |
| 2017/0366732 A1* | 12/2017 | Ota | H04N 5/23203 |
| 2018/0063407 A1 | 3/2018 | Torikai | |
| 2019/0132505 A1* | 5/2019 | Ohgishi | H04N 5/23203 |
| 2019/0215457 A1* | 7/2019 | Enke | G08G 5/0069 |
| 2020/0169690 A1* | 5/2020 | Sato | H04N 5/23235 |
| 2020/0366830 A1* | 11/2020 | Kikuchi | H04N 5/772 |
| 2021/0099648 A1* | 4/2021 | Ikeda | G06F 3/14 |

* cited by examiner

IMAGE CAPTURE APPARATUS, OPERATION APPARATUS AND CONTROL METHODS

BACKGROUND OF THE INVENTION

Field of the Invention

The present invention relates to a system capable of remotely operating an image capture apparatus by an external apparatus.

Description of the Related Art

A system capable of remotely controlling an image capture apparatus such as a video camera by an operation apparatus such as a tablet device is known. In addition, there is a configuration in which a video camera displays not only a viewfinder for displaying live view images and an OSD (On Screen Display), but also a GUI (Graphical User Interface) which is different from the OSD is displayed on an out-of-finder display unit. In such a camera, a camera operator can perform operations such as a focusing or a framing while looking at a live view image or the OSD on a viewfinder, and an assistant can perform an operation such as other settings by looking at the GUI of the out-of-finder display unit.

Japanese Patent Laid-Open No. 2016-100828 describes a system in which an operation screen of an image processing apparatus and an image of an operation unit are transmitted from an image processing apparatus to an operation apparatus such as a PC, and the image processing apparatus performs control according to an operation request received from the PC.

For cameras with the viewfinder and the out-of-finder display unit, the OSD of the viewfinder is suitable for operating the camera while checking the live view image on the operation apparatus. On the other hand, when checking the settings and status of the camera, etc. is required, the GUI of the out-of-finder display unit is suitable. When the GUI of the out-of-finder display unit is displayed on the operation apparatus, it is necessary to change the operation member of the GUI displayed on the operation apparatus to one corresponding to the out-of-finder display unit. Therefore, it will be more convenient that the user can selectively display the OSD and the GUI, which are simultaneously displayed on different display units of the camera, on the operation apparatus.

SUMMARY OF THE INVENTION

The present invention has been made in consideration of the aforementioned problems, and realizes techniques for selectively displaying different operation screens in an external apparatus which remotely operates an image capture apparatus.

In order to solve the aforementioned problems, the present invention provides an image capture apparatus which can be remotely controlled by an external apparatus, comprising: a communication unit configured to communicate with the external apparatus; an image capturing unit configured to generate a captured image; a first generation unit configured to generate a first operation screen which displays first information relating to the image capture apparatus and which includes the captured image; a second generation unit configured to generate a second operation screen which is different from the first operation screen and displays second information relating to the image capture apparatus and does not include the captured image; a first display unit configured to display the first operation screen; a second display unit which is different from the first display unit and displays the second operation screen; and a control unit configured to control the image capture apparatus based on an operation request for the image capture apparatus received from the external apparatus, wherein the control unit is configured to selectively transmit the first operation screen or the second operation screen to the external apparatus, based on an instruction from the external apparatus.

In order to solve the aforementioned problems, the present invention provides an operation apparatus capable of remotely controlling an image capture apparatus, comprising: a communication unit configured to communicate with the image capture apparatus; wherein the operation apparatus is configured to receive a first operation screen that includes a captured image, or a second operation screen that does not include the captured image, wherein each screen is received from the image capture apparatus based on an instruction of the operation apparatus; a display unit configured to display the first operation screen which operably displays first information relating to the image capture apparatus or the second operation screen which operably displays second information relating to the image capture apparatus; an operation unit configured to accept a user operation on the first operation screen or the second operation screen displayed on the display unit; and a control unit configured to control an operation request for the image capture apparatus according to the operation of the first operation screen or the second operation screen to be transmitted to the image capture apparatus.

In order to solve the aforementioned problems, the present invention provides a method of controlling an image capture apparatus which can be remotely controlled by an external apparatus, wherein the image capture apparatus comprises: a communication unit configured to communicate with the external apparatus; an image capturing unit configure to generate a captured image; a first generation unit configured to generate a first operation screen for displaying first information relating to the image capture apparatus and which includes the captured image; a second generation unit configured to generate a second operation screen which is different from the first operation screen and displays second information relating to the image capture apparatus and does not include the captured image; a first display unit configured to display the first operation screen; and a second display unit which is different from the first display unit and displays the second operation screen, wherein the method comprises: controlling the image capture apparatus based on an instruction received from the external apparatus to selectively transmit the first operation screen or the second operation screen to the external apparatus.

In order to solve the aforementioned problems, the present invention provides a method of controlling an operation apparatus capable of remotely controlling an image capture apparatus, wherein the operation apparatus comprises: a communication unit configured to communicate with the image capture apparatus; and a display unit, wherein the method comprises: receiving a first operation screen that includes a captured image, or a second operation screen that does not include the captured image based on an instruction of the operation apparatus, displaying the first operation screen which operably displays first information relating to the image capture apparatus or the second operation screen which operably displays second information relating to the image capture apparatus on the display unit; accepting a user operation on the first operation screen or the second operation screen displayed on the display unit; and controlling so as to transmit an operation request for the image capture apparatus according to the operation of the first operation screen or the second operation screen to the image capture apparatus.

In order to solve the aforementioned problems, the present invention provides a non-transitory computer-readable storage medium storing a program that causes a computer to execute a method of controlling an image capture apparatus which can be remotely controlled by an external apparatus, wherein the image capture apparatus comprises: a communication unit configured to communicate with the external apparatus; an image capturing unit configure to generate a captured image; a first generation unit configured to generate a first operation screen for displaying first information relating to the image capture apparatus and which includes the captured image; a second generation unit configured to generate a second operation screen which is different from the first operation screen and displays second information relating to the image capture apparatus and does not include the captured image; a first display unit configured to display the first operation screen; and a second display unit which is different from the first display unit and displays the second operation screen, wherein the method comprises: controlling the image capture apparatus based on an instruction received from the external apparatus to selectively transmit the first operation screen or the second operation screen to the external apparatus.

In order to solve the aforementioned problems, the present invention provides a non-transitory computer-readable storage medium storing a program that causes a computer to execute a method of controlling an operation apparatus capable of remotely controlling an image capture apparatus, wherein the operation apparatus comprises: a communication unit configured to communicate with the image capture apparatus; and a display unit, wherein the method comprises: receiving a first operation screen that includes a captured image, or a second operation screen that does not include the captured image based on an instruction of the operation apparatus, displaying the first operation screen which operably displays first information relating to the image capture apparatus or the second operation screen which operably displays second information relating to the image capture apparatus on the display unit; accepting a user operation on the first operation screen or the second operation screen displayed on the display unit; and controlling so as to transmit an operation request for the image capture apparatus according to the operation of the first operation screen or the second operation screen to the image capture apparatus.

According to the present invention, different operation screens can be selectively displayed on an external apparatus which remotely operates an image capture apparatus.

Further features of the present invention will become apparent from the following description of exemplary embodiments (with reference to the attached drawings).

DESCRIPTION OF THE EMBODIMENTS

Figures 1A, 1B:
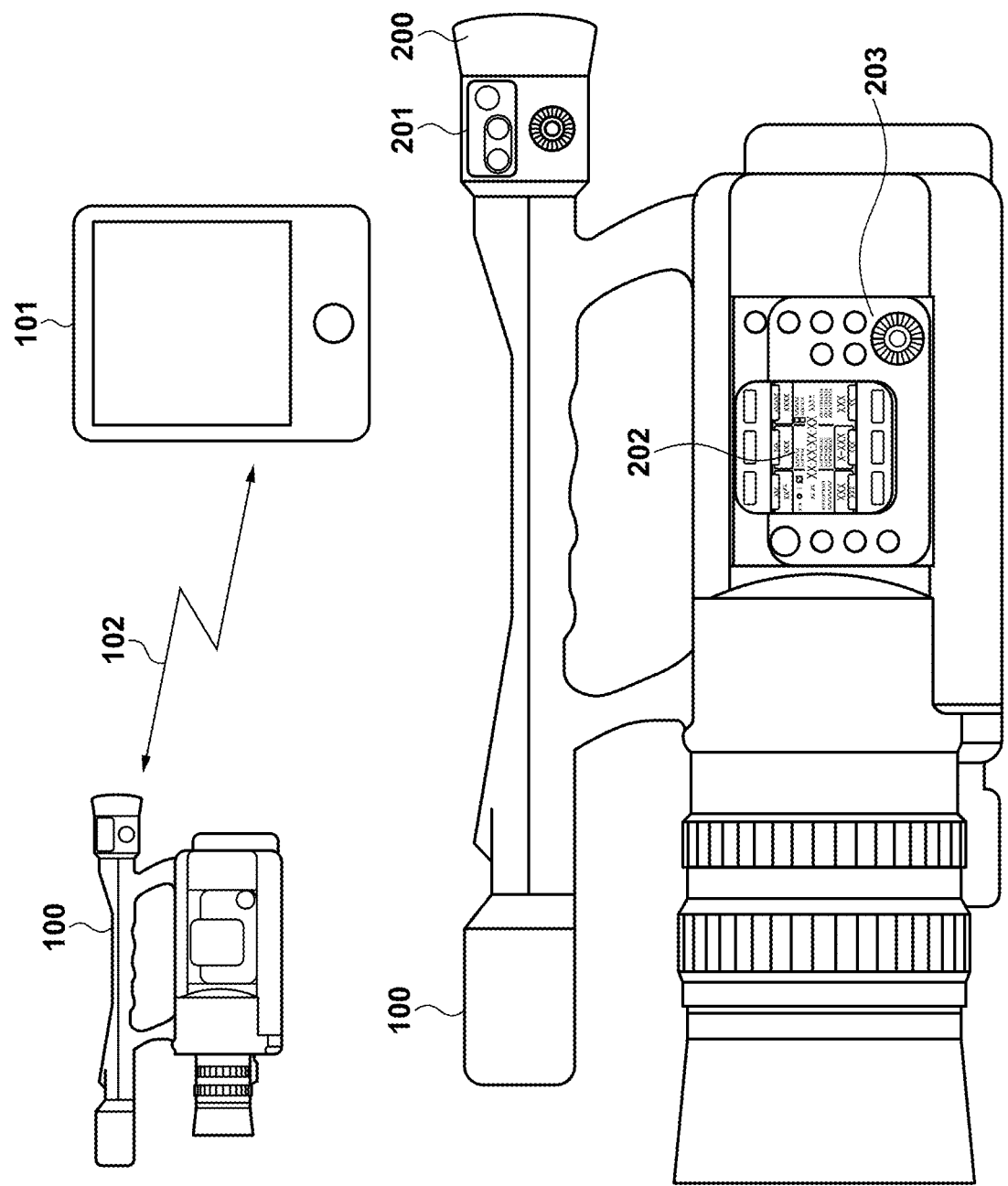
FIG. 1A is a diagram illustrating a system configuration according to a present embodiment.
FIG. 1B is an external view of a video camera 100 according to the present embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Hereinafter, an embodiment in which the image capture apparatus of the present invention is applied to a digital video camera and the operation apparatus of the present invention is applied to a tablet device will be described in detail with reference to the accompanying drawings. The operation apparatus of the present invention is not limited to the tablet device, and may be a smart phone, a personal computer (PC), or the like, which is a kind of a mobile phone.

<System Configuration>

First, a system configuration according to the present embodiment will be described with reference to FIG. 1A. FIG. 1A illustrates a system configuration in which the video camera 100 and the tablet device 101 according to the present embodiment are communicatively connected to each other, and the video camera 100 can be remotely controlled by the tablet device 101.

The video camera 100 and the tablet device 101 according to the present embodiment are communicatively connected via a communication network 102, and transmit and receive an OSD (On Screen Display) screen superimposed on a live view image, a GUI (Graphical User Interface) screen which is different from the OSD screen, or a captured image such as a live view image. In the present embodiment, a wireless LAN is used for the communication network 102, but the present invention is not limited to this, and other communication methods that can transmit and receive the OSD screen, the GUI screen, or a live view image may be applied. Other communication methods include, for example, wireless communication modules such as infrared communication, Bluetooth®, and Wirelesses USB. Wired connections such as RS-232C, RS-422A, USB, Ethernet®, HDMI®, and IEEE1394 may also be used.

In the system according to the present embodiment, in a field such as a video picture production in which shooting is performed by a plurality of persons, a part can be shared such that a camera operator performs an operation of a video camera 100 such as a focusing or a framing and an assistant performs an operation such as other settings of the camera. The tablet device 101 displays the OSD screen superimposed on the live view image received from the video camera 100. Thus, the operation member corresponding to the operation unit of the video camera 100 is displayed as the operation unit of the OSD screen. A user who operates the video camera 100 with the tablet device 101 can operate the video camera 100 with the operation unit of the OSD screen while checking the live view image and the OSD screen. When the user operates the operation unit of the OSD screen of the tablet device 101, the tablet device 101 transmits an operation event of the OSD screen as an operation request for the video camera 100. In the system according to the present embodiment, the same screen as the OSD screen displayed on a first display unit 200 of the video camera 100 or the GUI screen displayed on a second display unit 202 is also displayed with the operation members on the tablet device 101. Thereby, the user can operate the video camera 100 while viewing the same screen as the video camera 100. Further, in terms of development, since it is not necessary to individually implement screens such as menu screens corresponding to the OSD screen or the GUI screen of the video camera 100 on the tablet device 101, there is an advantage that the development man-hour can be shortened.

Next, with reference to FIGS. 1B and 2A, the configuration and functions of the video camera 100 according to the present embodiment will be described.

FIG. 1B is a side view illustrating the external configuration of the video camera 100 according to the present embodiment.

The first display unit 200 is a viewfinder display unit which functions as an electronic viewfinder (EVF) of the video camera 100 is comprised of a display device such as a liquid crystal panel or an organic EL panel which is viewable by the user looking through the display device. On the first display unit 200, the OSD screen superimposed on the live view image is displayed so as to be operable by the user. A first operation unit 201 is an operation member such as a push button or a rotary dial for operating the OSD screen displayed on the first display unit 200.

As will be described in FIGS. 7A-7C, numerical values, character strings, and the like indicating information related to the photographing processing of the video camera 100 are displayed on the OSD screen. Further, on the OSD screen, numerical values and character strings indicating information relating to an image quality such as a brightness or a contrast of the captured image, numerical values, character strings and frames indicating information relating a focusing and a zooming, other icons, markers, menus, and/or the like are displayed so as to be operable by the first operation unit 201.

The second display unit 202 is an out-of-finder display unit provided at a position (side surface of the camera body) which is different from the first display unit 200 and displays the setting information and the setting menu of the camera, and/or the like. The second display unit 200 is comprised of a display device such as a liquid crystal panel or an organic EL panel which can be visible without a user looking through the display device. On the second display unit 202, the GUI screen which is different from the OSD screen to be displayed on the first display unit 200 is displayed operably by the user. A second operation unit 203 is an operation member such as a push button or a rotary dial for operating the GUI screen displayed on the second display unit 202.

As will be described later in FIGS. 7A-7C, numerical values, character strings, cursors, and the like indicating information related to the shooting processing such as the diaphragm, shutter speed, ISO-sensitivity, and the like of the video camera 100 are displayed on the GUI screen so that the GUI screen can be operated by the second operation unit 203.

Figure 2A:
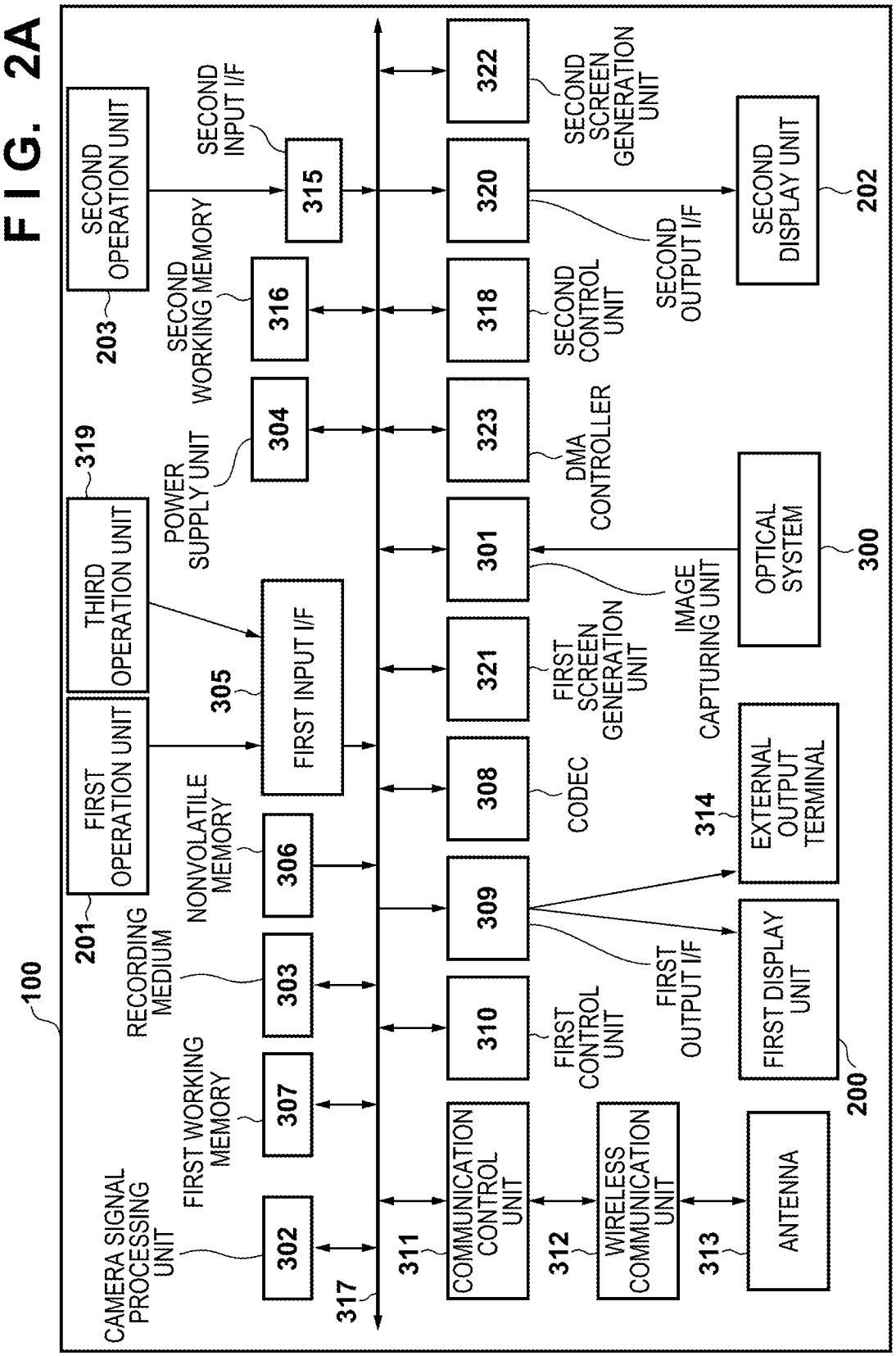
FIG. 2A is a block diagram illustrating an internal configuration of a video camera 100 according to the present embodiment.

FIG. 2A is a block diagram illustrating the internal configuration of the video camera 100 according to the present embodiment.

A first control unit 310 and a second control unit 318 are arithmetic processing units comprised of at least one processor or circuit, and control each component of the video camera 100 by reading and executing a program stored in a nonvolatile memory 306 which will be described later. The first control unit 310 and the second control unit 318 mutually transmit and receive data via a data bus 317.

The first display unit 200, the first operation unit 201, the second operation unit 203, an optical system 300, an image capturing unit 301, a camera signal processing unit 302, and a recording medium 303 are components controlled by the first control unit 310 and transmit and receive data to and from each other via the data bus 317. A power supply unit 304, a first input interface (I/F) 305, a first working memory 307, a codec 308, and a first output I/F 309 are components controlled by the first control unit 310, and mutually transmit and receive data via the data bus 317. A communication control unit 311, an external output terminal 314, a third operation unit 319, and a first screen generation unit 321 are components controlled by the first control unit 310, and mutually transmit and receive data via the data bus 317.

The second display unit 202, the second operation unit 203, a second inputting I/F 315, a second working memory 316, a second outputting I/F 320, and a second screen generation unit 322 are components controlled by the second control unit 318, and mutually transmit and receive data via the data bus 317.

The optical system 300 includes a photographing lens such as a focus lens or a zoom lens, an aperture, and/or the like to form an optical image of the subject.

An image capturing unit 301 includes an image sensor comprised of an image capturing element such as a CCD or a CMOS for outputting an analog signal by photoelectrically converting an optical image of a subject transmitted through the optical system 300, and an A/D converter for converting an analog signal output from the image sensor into digital signal.

The camera signal processing unit 302 performs a resizing process, a color conversion process, and/or the like, such as predetermined pixel interpolation and reduction, on the digital signal generated by the image capturing unit 301. Further, the image data processed by the camera signal processing unit 302 is compressed and encoded in predetermined format and bit rate by a codec 308 which will be described later, and recorded in the recording medium 303 as a video file. The recording medium 303 is a memory card, a hard disk, or the like, and records a video file and metadata associated with a video.

A power supply unit 304 includes a primary battery such as an alkaline battery or a lithium battery, a secondary battery such as a NiCd battery, a NiMH battery or a Li-ion battery, an AC adapter or the like, and supplies power required for each component of the video camera 100.

The first operation unit 201 is an operation member for operating the OSD screen displayed on the first display unit 200, and includes a menu button, a cross key, and a BACK button. A third operation unit 319 is an operation member other than the first operation unit 201 provided in the camera body. The input information accepted by the first operation unit 201 and the third operation unit 319 is input to the first control unit 310 via the first input I/F 305 and the data bus 317.

The nonvolatile memory 306 is an electrically erasable/recordable memory, and a flash ROM or the like is used, for example. The nonvolatile memory 306 stores constants, computer programs, and the like for the operation of the first control unit 310 and the second control unit 318. Here, the program is a program for executing a flowchart which will be described later. Further, the nonvolatile memory 306 stores a server program for communicating with the tablet device 101 in which the video camera 100 operating as an HTTP server operates as an HTTP client. The nonvolatile memory 306 also stores a WEB application executed by a WEB browser running on the tablet device 101 as an HTTP client.

The first working memory 307 is a volatile memory such as a RAM, and is used as a work area for expanding constants and variables for the operation of the first control unit 310, a program read out from the nonvolatile memory 306, and the like. The first working memory 307 also stores event information which a communication control unit 311 which will be described later, receives from the tablet device 101. The first working memory 307 also acts as a relay for relaying the OSD data generated by the first screen generation unit 321 when the communication control unit 311 transmits the OSD data.

The codec 308 compresses and encodes the image data written in the first working memory 307 in a predetermined format such as JPEG, MPEG or H.264 at a bit rate to generate a video file, and records the video file on the recording medium 303. The codec 308 decodes the video file recorded on the recording medium 303 in a predetermined format and bit rate, and stores the decoded video file in the first working memory 307. Further, the image data decoded by the codec 308 and the live view image data obtained by the camera signal processing unit 302 are converted into display signal by the first output I/F 309, is displayed on an external monitor connected to the first display unit 200 and/or the external output terminal 314.

The first screen generation unit 321 renders the OSD screen data of the video camera 100 to a VRAM of the first working memory 307. The menu has a screen configuration that can be operated by the first operation unit 201. Further numerical values, character strings, icons, and the like are stored in the nonvolatile memory 306 and rendered to read the VRAM by the first screen generation unit 321.

The first output I/F 309 converts the OSD screen data generated by the first screen generation unit 321 into display signals for displaying the OSD screen data on the first display unit 200 or an external monitor connected to the external output terminal 314. The first output I/F 309 includes a mixer circuitry and generates composite image data obtained by superimposing OSD screen data on the image data decoded by the codec 308 and the live view image data obtained by the camera signal processing unit 302. Furthermore, the first output I/F 309 converts the composite image data to display signal for displaying the external monitor connected to the first display unit 200 and the external output terminal 314.

The second operation unit 203 is an operating member for operating the GUI screen displayed on the second display unit 202, a power supply button, a HOME button, a BACK button, a rotary dial, or otherwise includes six functional buttons arranged on both sides of the screen of the second display unit 202. The input data accepted by the second operation unit 203 is input to the second control unit 318 via the second input I/F 315 and the data bus 317. Note that the second operation unit 203 may include a touch panel integrally formed with the second display unit 202 and allow a touch operation of the GUI screen displayed on the second display unit 202.

The second working memory 316 is a volatile memory such as a RAM, and is used as a work area for developing constants and variables for the operation of the second control unit 318, computer programs read from the nonvolatile memory 306, and the like. The second working memory 316 also stores event information received from the first control unit 310. Further, the second working memory 316 also acts as a relay for relaying the GUI screen data generated by the second screen generation unit 322 when the communication control unit 311 transmits the GUI screen data.

The second screen generation unit 322 renders the GUI screen data of the video camera 100 to the VRAM of the second working memory 316. The menu has a screen configuration that can be operated by the second operation unit 203. Further numerical values, character strings, icons, and the like are stored in the nonvolatile memory 306 and rendered to read the VRAM by the second screen generation unit 322.

A DMA (Direct Memory Access) Controller 323 performs direct data transfer between the first working memory 307 and the second working memory 316. When the GUI screen data generated by the second screen generation unit 322 is transmitted to the tablet device 101, the DMA controller 323 transfers data from the second working memory 316 to the first working memory 307 based on an instruction from the first control unit 310, and the data is transmitted from the first control unit 310 to the communication control unit 311.

The second outputting I/F 320 converts the GUI screen data generated by the second screen generation unit 322 into display signals for displaying the GUI screen data on the second display unit 202.

The communication control unit 311 receives event information such as an operation input or a setting change from the tablet device 101 to the video camera 100 via a wireless communication unit 312, and transmits a response to a request from the tablet device 101. The event information received from the tablet device 101 is notified to the first control unit 310, and after determining which of the first control unit 310 and the second control unit 318 performs processing of the event, the event to be processed by the second control unit 318 is notified to the second control unit 318. The communication control unit 311 also transmits the video data, the WEB application, and the OSD screen data generated by the first screen generation unit 321 to the tablet device 101. The live view image data and the OSD data comprising the OSD screen data may be transmitted separately to display a composite image superimposed on the tablet device 101, or may be transmitted as composite image data. Further, the communication control unit 311 may transmit the GUI screen data generated by the second screen generation unit 322 instead of the OSD data generated by the first screen generation unit 321.

The wireless communication unit 312 is a wireless communication module which transmits and receives radio signal to and from the tablet device 101 by an antenna 313. The wireless communication unit 312 receives a request for the tablet device 101 as a wireless signal from the antenna 313. The communication control unit 311 demodulates the wireless signal received from the antenna 313. The first control unit 310 acquires packet data. Further, as a response to a request received from the tablet device 101, the wireless communication unit 312 transmits a wireless signal in which the communication control unit 311 modulates the packet data generated by the first control unit 310 to the frequency band of the carrier wave from the antenna 313 to the tablet device 101.

<Configuration of Tablet Device 101>

Next, with reference to FIG. 2B, the internal configuration of the tablet device 101 according to the present embodiment will be described.

Figure 2B:
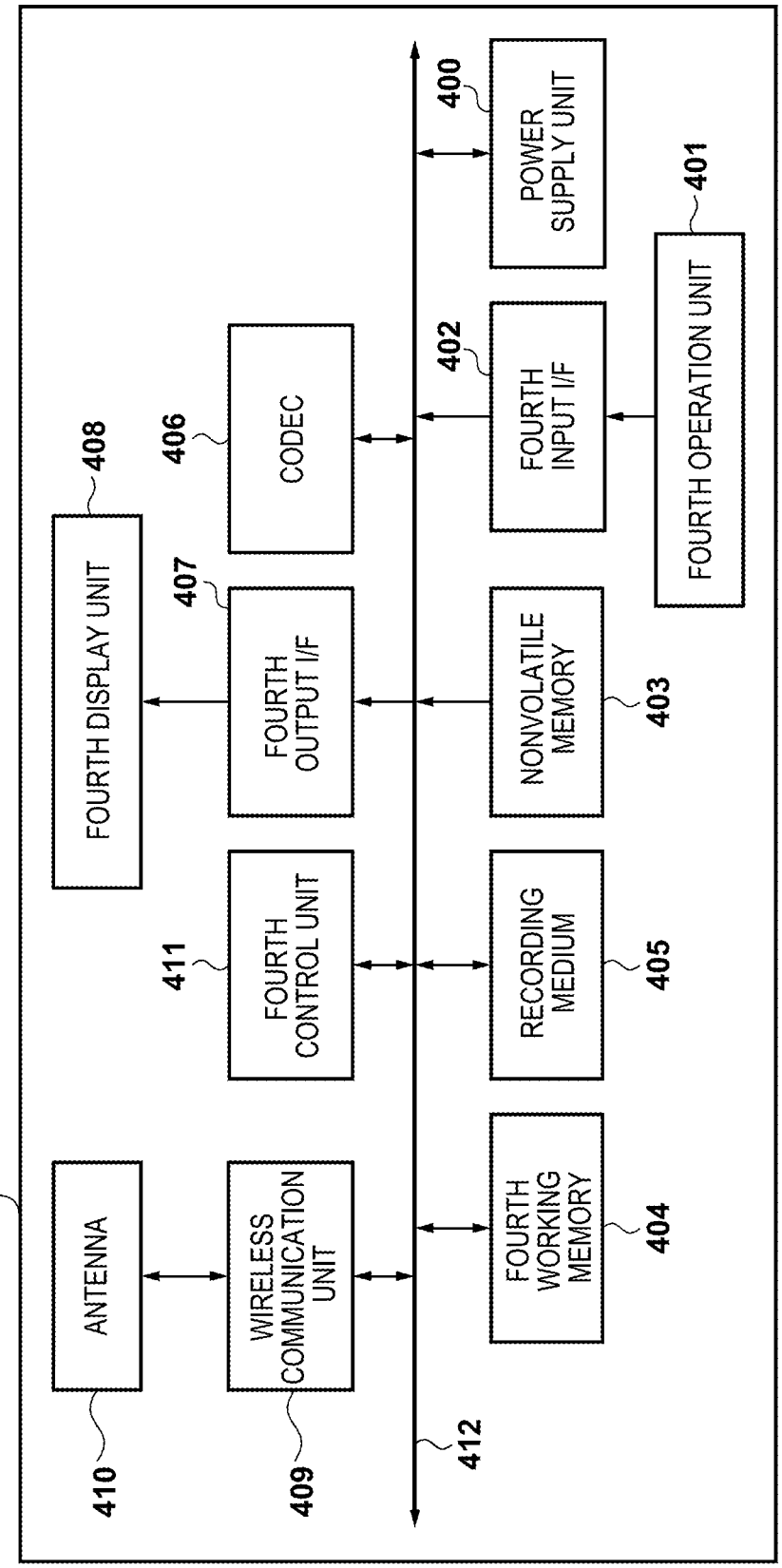
FIG. 2B is a block diagram illustrating an internal configuration of a tablet device 101 according to the present embodiment.

FIG. 2B is a block diagram illustrating the internal configuration of the tablet device 101 according to the present embodiment.

A fourth control unit 411 is an arithmetic processing unit comprised of at least one processor or circuit, and controls each component of the tablet device 101 by reading and executing a program stored in a nonvolatile memory 403 which will be described later.

A power supply unit 400, a fourth operation unit 401, a fourth input I/F 402, a nonvolatile memory 403, a fourth working memory 404, a recording medium 405, a codec 406, a fourth output I/F 407, a fourth display unit 408, and a wireless communication unit 409 are components controlled by the fourth control unit 411, and mutually transmit and receive data via the data bus 412.

The power supply unit 400 includes a primary battery such as an alkaline battery or a lithium battery, a secondary battery such as a NiCd battery, a NiMH battery or a Li-ion battery, an AC adapter or the like, and supplies power required for each component of the tablet device 101.

The fourth operation unit 401 is an operation member such as various switches and buttons which accepts various operations from the user and notifies the fourth control unit 411. The fourth operation unit 401 includes a power button, a HOME button, and the like. The fourth operation unit 401 is integrally formed with the fourth display unit 408, and includes a touch panel capable of detecting a touch operation on the display screen of the fourth display unit 408. By associating the input coordinates on the touch panel with the display coordinates on the fourth display unit 408 in an application or the like operating on the tablet device 101, it is possible to form the GUI as if the user can directly operate the screen displayed on the fourth display unit 408. The touch panel may be a device capable of acquiring the contact strength (pressing force).

The input data accepted by the fourth operation unit 401 is input to the fourth control unit 411 via the fourth input I/F 402 and the data bus 412.

The nonvolatile memory 403 is an electrically erasable/recordable memory, and for example, a flash ROM or the like is used. The nonvolatile memory 403 stores constants, computer programs, and the like for the operation of the fourth control unit 411. Here, the program is a program for executing a flowchart which will be described later. Further, the nonvolatile memory 403 stores a server program for enabling the tablet device 101 operating as an HTTP client to communicate with the video camera 100 operating as an HTTP server. The nonvolatile memory 403 stores part of the WEB application received from the video camera 100 acting as the HTTP server. Instead of the nonvolatile memory 403, the server program or the WEB application may be stored in a recording medium 405 which will be described later. An auxiliary storage device such as a hard disk may be used instead of the nonvolatile memory 403 or to compensate for the storage area of the fourth working memory 404.

The fourth control unit 411 can execute the WEB application received from the video camera 100. The WEB application includes OSD screen data and GUI screen data generated by the video camera 100. The live view image data, the OSD screen data, and the GUI screen data included in the WEB application can be received from the video camera 100 by the wireless communication unit 409.

The fourth working memory 404 is a volatile memory such as a RAM, and is used as a work area for developing constants and variables for the operation of the fourth control unit 411, computer programs read from the nonvolatile memory 403, and the like. The fourth working memory 404 also stores requests and event information transmitted to the video camera 100 through the wireless communication unit 409.

The recording medium 405 is a memory card, a hard disk, or the like, and records video files, OSD screen data, GUI screen data, and the like received from the video camera 100.

The codec 406 compresses and encodes the image data written in the fourth working memory 404 in a predetermined format such as JPEG, MPEG or H.264 at a bit rate to generate a video file, and records the video file on the recording medium 405. The codec 406 decodes the video file recorded on the recording medium 405 in a predetermined format and bit rate, and stores the decoded video file in the fourth working memory 404. The image data decoded by the codec 406 is converted into display signals by the fourth output I/F 407, and the display signals are displayed on the fourth display unit 408.

The fourth output I/F 407 converts the live view image data, OSD screen data, or GUI screen data received from the video camera 100 decoded by the codec 406 into a display signal for displaying on the fourth display unit 408. The fourth output I/F 407 converts data of the operation unit of the OSD screen or the GUI screen generated by the tablet device 101 into display signals for displaying the data on the fourth display unit 408.

The fourth display unit 408 is comprised of a display device such as a liquid crystal panel or an organic EL panel. The fourth display unit 408 displays the live view image data, the OSD screen data, and the GUI screen data received from the video camera 100. The fourth display unit 408 displays the data of the operation unit of the OSD screen or the GUI screen generated by the tablet device 101.

A wireless communication unit 409 is a wireless communication module for transmitting and receiving radio signal to and from the video camera 100 by an antenna 410. The wireless communication unit 409 transmits a request, a response, event information, and the like to the video camera 100 as a wireless signal from the antenna 410. In addition, the wireless communication unit 409 receives live view image data, OSD screen data, and GUI screen data generated by the video camera 100 as the response received from the video camera 100. The wireless communication unit 409 receives the live view image data, the OSD screen data, and the GUI screen data included in the WEB application from the video camera 100. In addition, the wireless communication unit 409 can transmit input information operated by the user to the video camera 100 in response to input information on a first operation screen, the GUI screen, and a second operation screen, which will be described later in FIG. 7C including the OSD screen and the operation units displayed on the fourth display unit 408, and input information on the second operation screen, which will be described later in FIGS. 7A and 7B including the GUI screen and the operation units. The input information includes an operation event as a display request for the menu.

In the system according to the present embodiment, it is assumed that the video camera 100 acts as an HTTP server, and the tablet device 101 acts as an HTTP client, and performs a wireless communication with the video camera 100. In the tablet device 101, the wireless communication unit 409 converts the wireless signal received from the video camera 100 via the antenna 410 into packet data, and outputs the packet data to the fourth control unit 411 via the buffer area of the fourth working memory 404. The response to be transmitted to the video camera 100 in response to the request is converted into packet data by the fourth control unit 411, and is transmitted from the antenna 410 to the video camera 100 as wireless signal modulated into a frequency band of a carrier wave by the wireless communication unit 409.

<Control Processing>

Next, coordinated operations of the video camera 100 and the tablet device 101 according to the present embodiment will be described with reference to FIGS. 3 to 7C.

Figure 3:
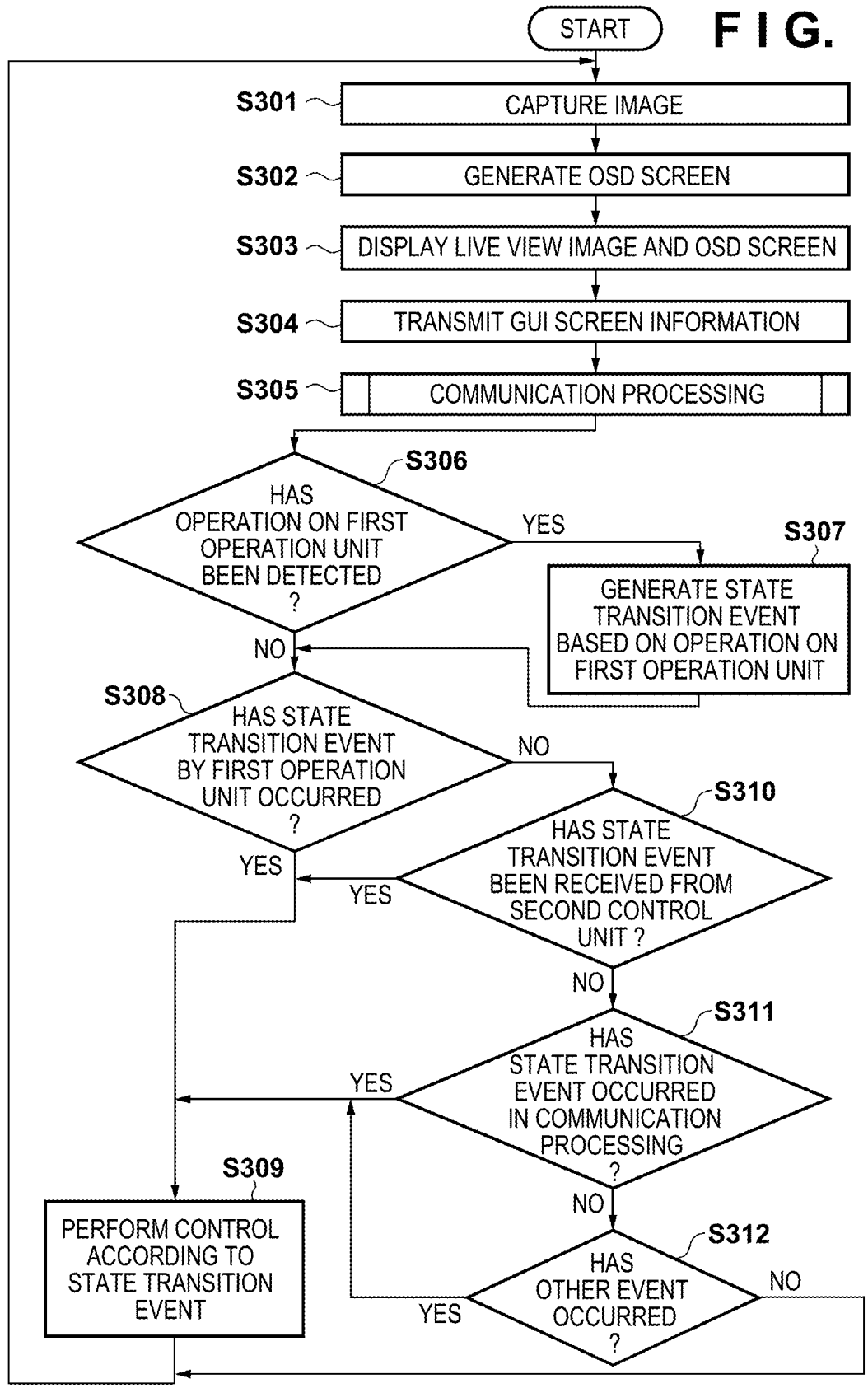
FIG. 3 is a flowchart illustrating operations of the video camera 100 according to the present embodiment.
Figure 4A:
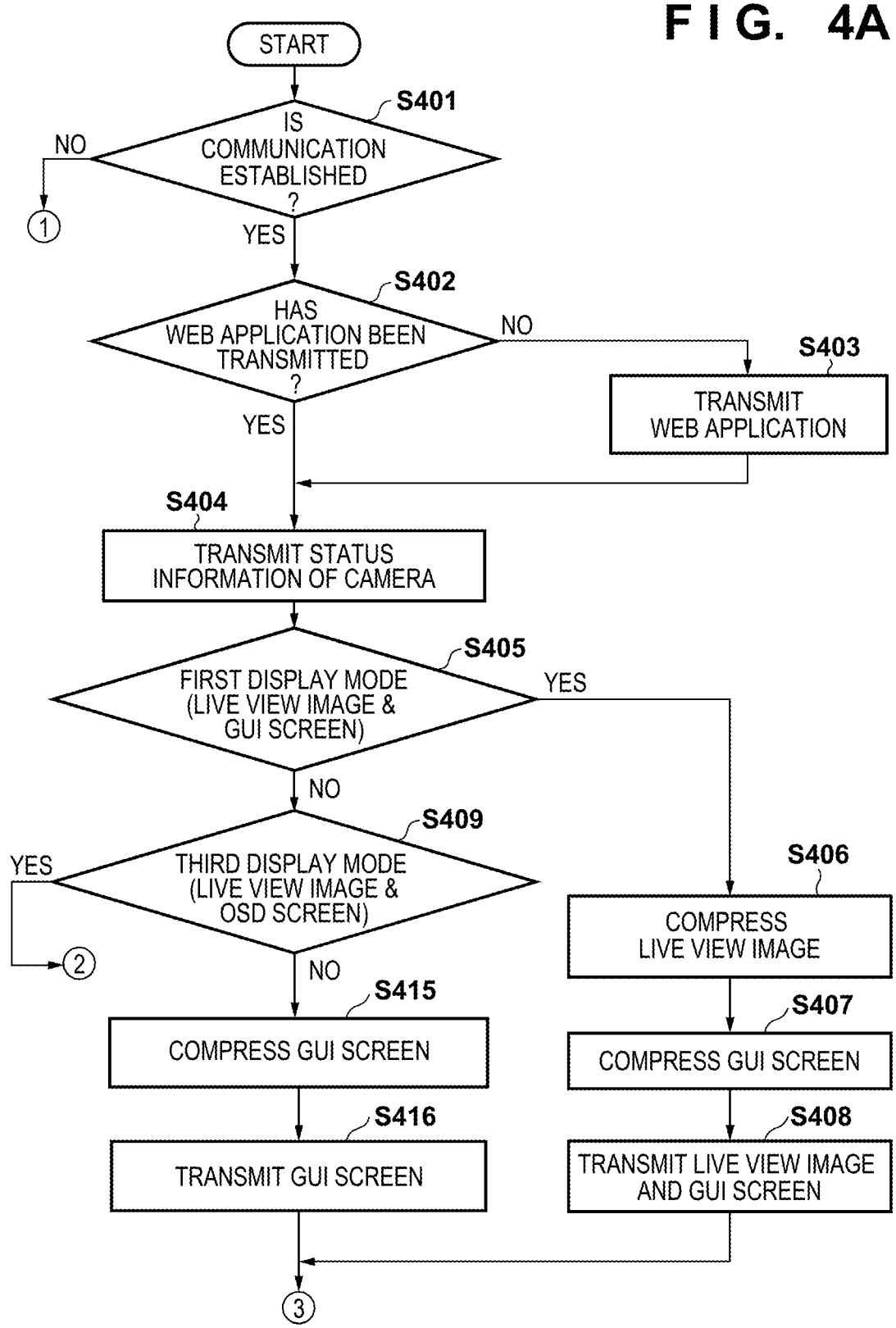
FIGS. 4A and 4B are flowcharts illustrating operations of the video camera 100 according to the present embodiment.
Figure 4B:
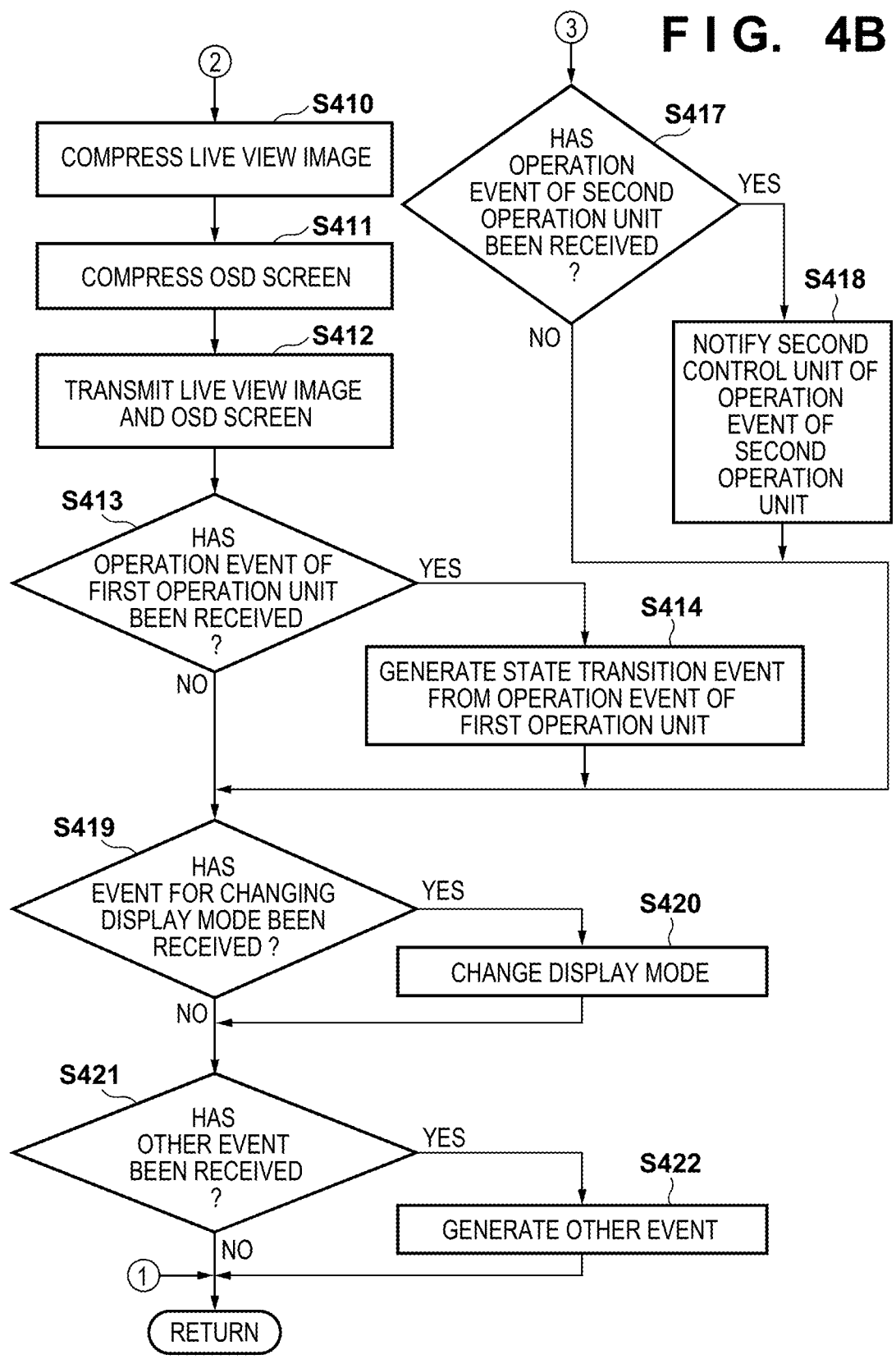
Figure 5:
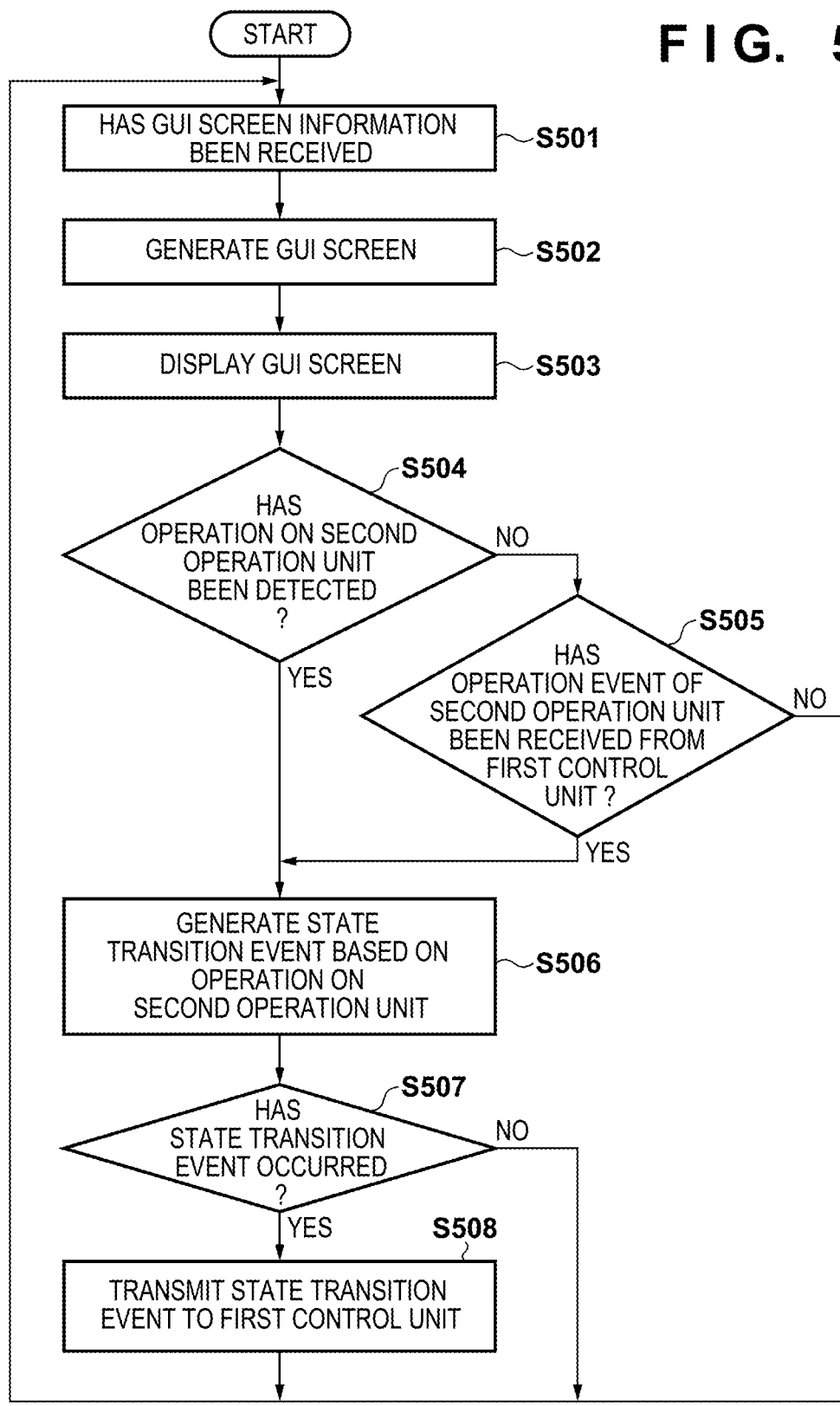
FIG. 5 is a flowchart illustrating operations of the video camera 100 according to the present embodiment.
Figure 6A:
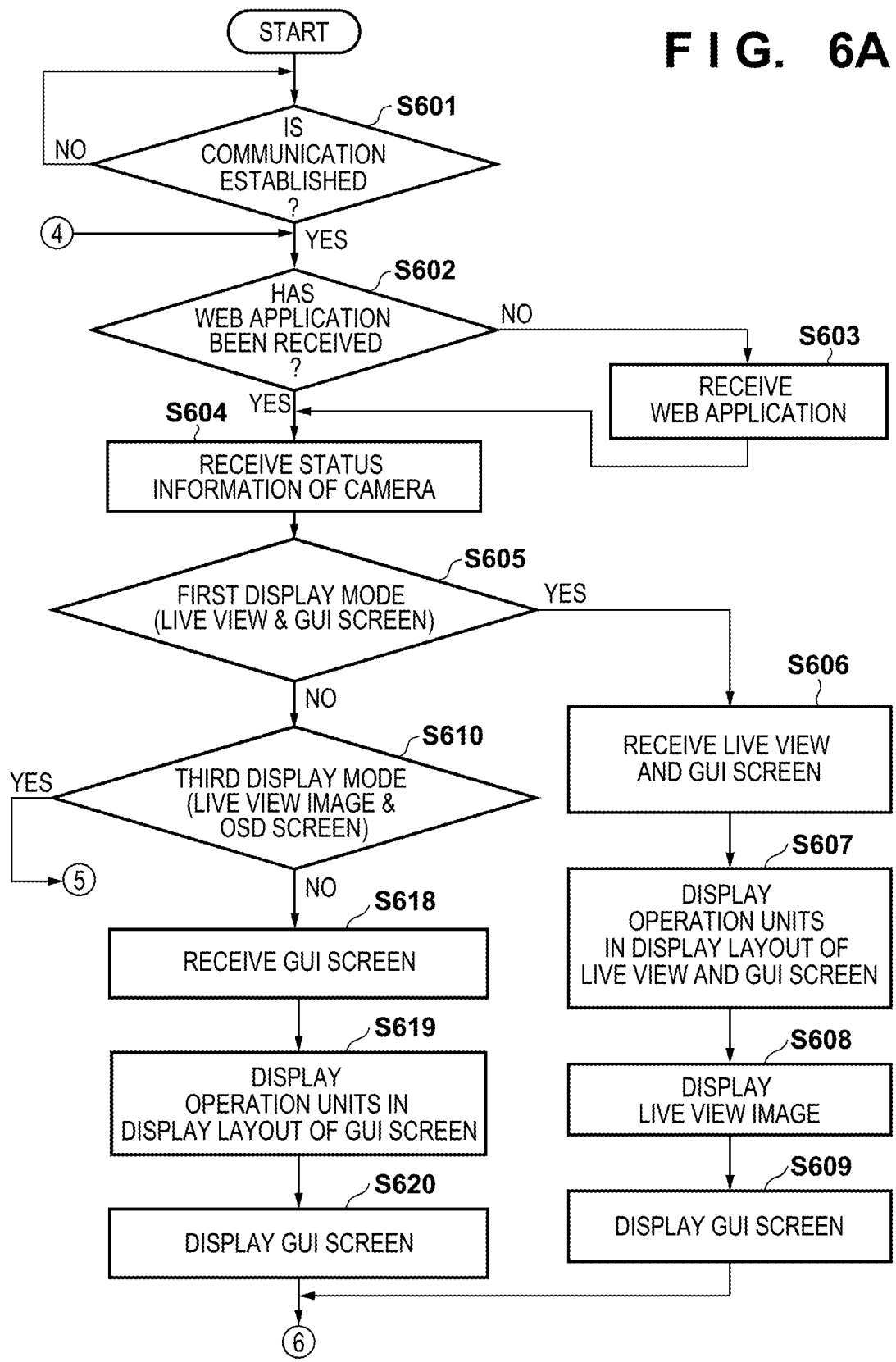
FIGS. 6A and 6B are flowcharts illustrating operations of the tablet device 101 according to the present embodiment.
Figure 6B:
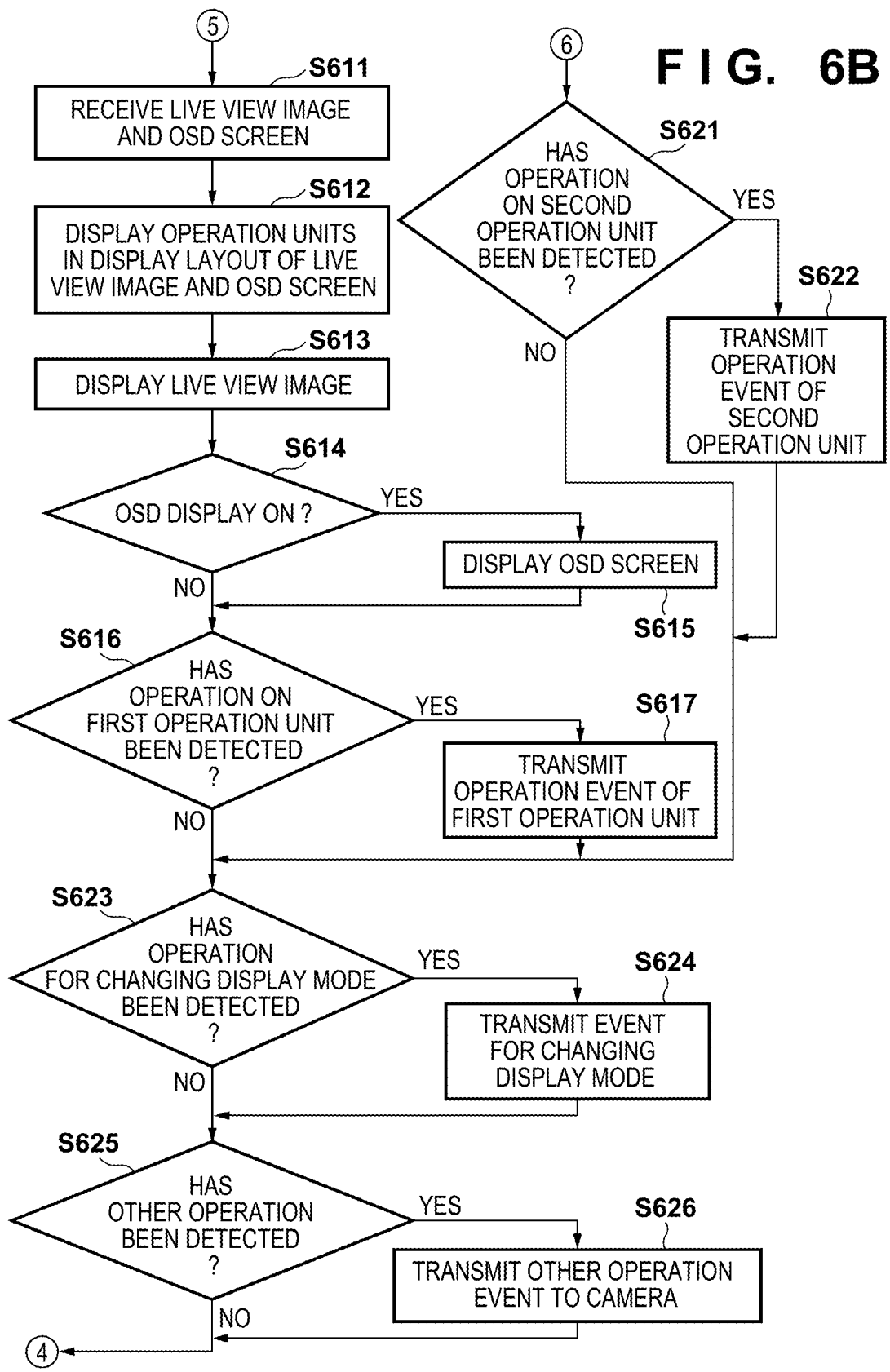

FIGS. 3 to 5 are flowcharts illustrating the operation of the video camera 100. The processing of FIGS. 3 to 5 is realized by the first control unit 310 or the second control unit 318 executing a program stored in the nonvolatile memory 306 or the recording medium 303 and controlling each component of the video camera 100. Alternatively, the processing of FIGS. 3 to 5 is realized by the first control unit 310 or the second control unit 318 executing a program acquired from the video camera 100 via the wireless communication unit 312 and controlling each component of the video camera 100. FIGS. 6A and 6B are flowcharts illustrating the operation of the tablet device 101.

The processing of FIGS. 6A and 6B is realized by the fourth control unit 411 executing a program acquired from the video camera 100 via the nonvolatile memory 403 or the wireless communication unit 409, and controlling each component of the tablet device 101. FIGS. 7A-7C are examples of operation screens including the live view images, the OSD screens, the GUI screens, and the operation units thereof for respective display modes displayed on the tablet device 101.

First, with reference to FIG. 3, the operation of the first control unit 310 of the video camera 100 will be described.

In step S301, the first control unit 310 captures a live view image by controlling the image capturing unit 301 and the camera signal processing unit 302.

In step S302, the first control unit 310 causes the first screen generation unit 321 to generate OSD screen data to be displayed on the first display unit 200, and renders the OSD screen data in the VRAM of the first working memory 307.

In step S303, the first control unit 310 outputs a composite image obtained by superimposing the OSD screen data generated in step S302 on the live view image generated in step S301, to the first display unit 200.

In step S304, the first control unit 310 transfers information on the GUI screen to be displayed on the second display unit 202 to the second control unit 318 via the DMA controller 323.

In step S305, the first control unit 310 performs communication processing with the tablet device 101 by processing of FIGS. 4A and 4B which will be described later.

In step S306, the first control unit 310 determines whether or not the operation has been made on the first operation unit 201. When the first control unit 310 determines that the operation has been made on the first operation unit 201, the first control unit 310 advances the processing to step S307, and otherwise the first control unit 310 advances the processing to step S308.

In step S307, the first control unit 310 generates a state transition event based on the operation of the first operation unit 201. The state transition event includes input information corresponding to the user operation such as a display request for a menu screen, a request for changing a menu item, or a request for changing an exposure parameter.

In step S308, the first control unit 310 determines whether or not the state transition event of the video camera 100 has occurred by the operation of the first operation unit 201 or the third operation unit 319. The first control unit 310 advances the processing to step S309 when the first control unit 310 determines that the state transition event of the video camera 100 has occurred by the operation of the first operation unit 201 or the third operation unit 319, and otherwise the first control unit 310 advances the processing to step S310.

In step S309, the first control unit 310 performs control of the video camera 100 according to the state transition event generated in step S308.

In step S310, the first control unit 310 determines whether the state-transition event has been received from the second control unit 318 via the DMA controller 323. The first control unit 310 advances the processing to step S309 when the first control unit 310 determines that the first control unit 310 has received the state transition event from the second control unit 318, and otherwise the first control unit 310 advances the processing to step S311.

In step S311, the first control unit 310 determines whether or not the state transition event has occurred in the communication processing. The first control unit 310 advances the processing to step S309 when the first control unit 310 determines that the state transition event has occurred in the communication processing, and otherwise the first control unit 310 advances the processing to step S312.

In step S312, the first control unit 310 determines whether or not a state transition event other than the state transition event generated in steps S308 to S311 has occurred. The state transition event determined here includes an event without the user operation such as a voltage drop of the power supply unit or a capacity drop of the recording medium, and other events of the tablet device 101 in processing of FIGS. 6A and 6B which will be described later. When the first control unit 310 determines that the state transition event other than the state transition event generated in steps S308 to S311 has occurred, the first control unit 310 advances the processing to step S309, and otherwise the first control unit 310 returns the processing to step S301.

Next, the communication processing of step S305 of FIG. 3 will be described with reference to FIGS. 4A and 4B.

In step S401, the first control unit 310 reads the setting of the communication function from the first working memory 307, and determines whether or not the communication function is set to be ON (enabled) and the communication with the tablet device 101 is established. The first control unit 310 advances the processing to step S402 when the first control unit 310 determines that the communication function is set to be ON (enabled) and the communication with the tablet device 101 is established, and otherwise the first control unit 310 terminates the processing.

In step S402, the first control unit 310 determines whether or not the WEB application has been transmitted to the tablet device 101. When the first control unit 310 determines that the WEB application has already been transmitted to the tablet device 101, the first control unit 310 advances the processing to step S404, and otherwise the first control unit 310 advances the processing to step S403.

In step S403, the first control unit 310 causes the communication control unit 311 to transmit the WEB application read from the nonvolatile memory 306 to the tablet device 101 via the wireless communication unit 312. The WEB application transmitted in step S403 includes information relating to the live view image, the OSD screen, the GUI screen, the operation units, and the display layout thereof for respective display modes of the tablet device 101. The display mode of the tablet device 101 includes a first display mode, a second display mode, and a third display mode. The first display mode is a display mode for displaying a live view image, the GUI screen, and an operation unit. The second display mode is a display mode for displaying the GUI screen and the operation portion without displaying the live view image. The third display mode is a display mode in which a composite image in which the OSD screen is superimposed on a live view image and an operation unit are displayed. FIGS. 7A-7C illustrate examples of the operation screens for respective display modes of the tablet device 101. FIG. 7A is an example of the second operation screen displayed in the first display mode. FIG. 7B is an example of the second operation screen displayed in the second display mode. FIG. 7C is an example of the first operation screen displayed in the third display mode. The image 700 in FIG. 7A is a live view image. Images 701 in FIGS. 7A and 7B are GUI screens. An operation unit 702 in FIGS. 7A and 7B is an operation unit of the GUI screen corresponding to the second operation unit 203. An operation unit 703 in FIGS. 7A to 7C is an operation unit commonly used in all display modes of the tablet device 101 for changing the display modes. An image 704 in FIG. 7C is a live view image. An operation unit 705 in FIG. 7C is an operation unit of the OSD screen superimposed on the live view image 704 and corresponding to the first operation unit 201 of the video camera 100.

Figure 7A:
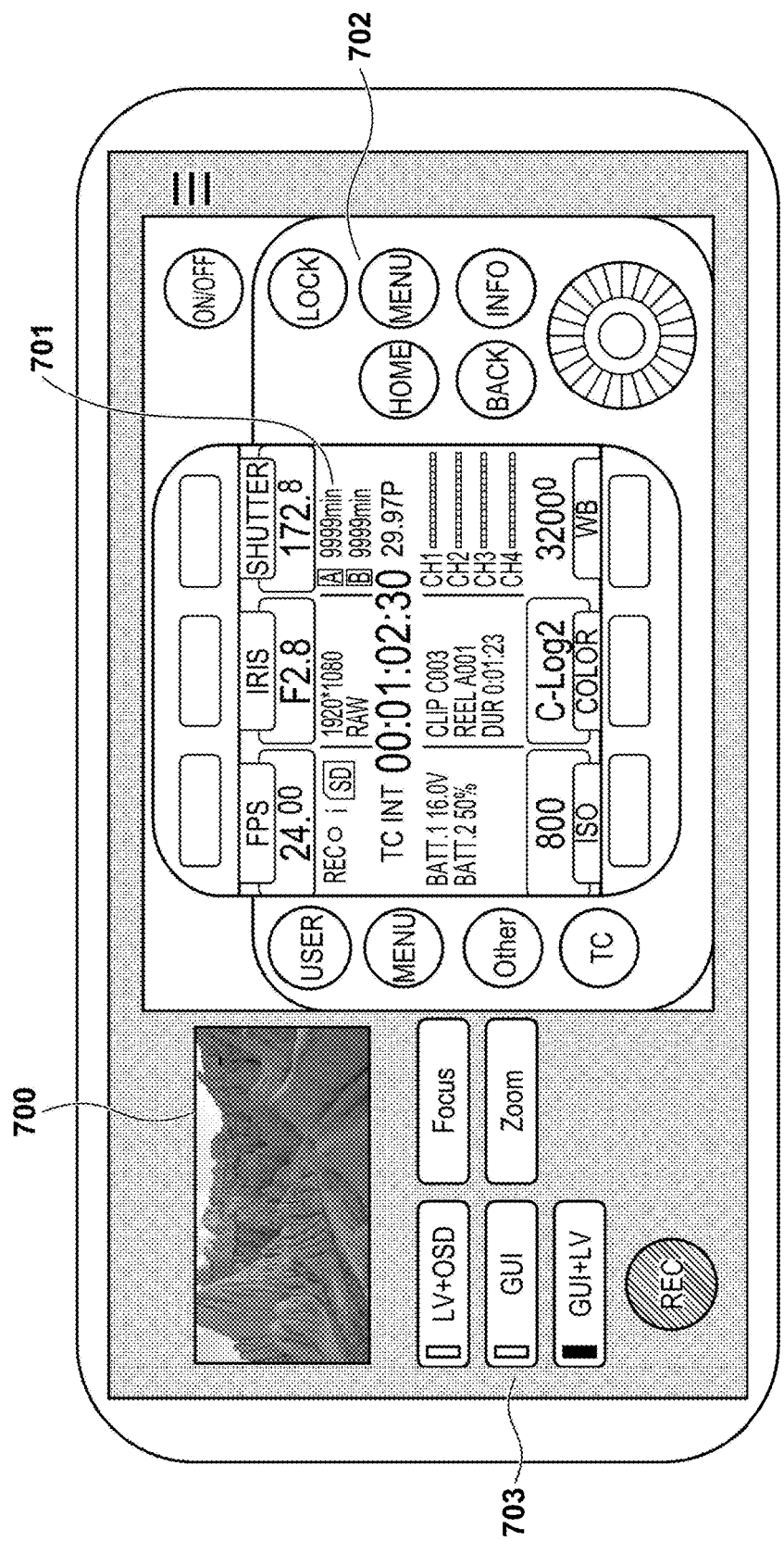
FIGS. 7A-7C are examples of operation screens for respective display modes of the tablet device 101.
Figure 7B:
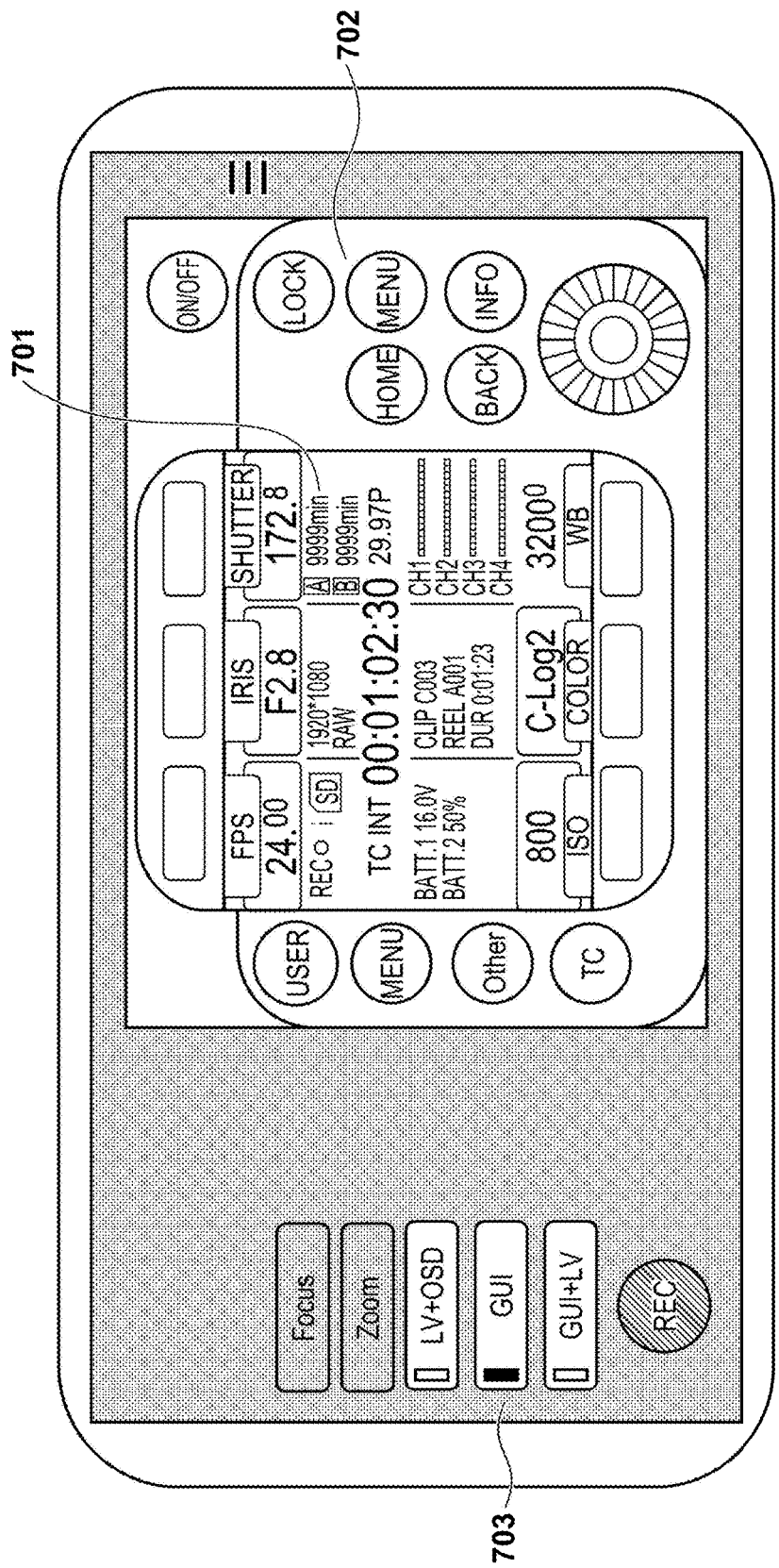

The second operation screen shown in FIG. 7A includes the GUI screen 701, images of the operation units 702 and 703, and a live view image. The second operation screen shown in FIG. 7B includes the GUI screen 701 and images of the operation units 702 and 703. The first operation screen shown in FIG. 7C includes the OSD screen superimposed on the live view image 704 and images of the operation units 703 and 705.

In step S404, the first control unit 310 causes the communication control unit 311 to transmit the status information of the video camera 100 read from the first working memory 307 to the tablet device 101 via the wireless communication unit 312.

In step S405, the first control unit 310 determines whether or not the display mode of the tablet device 101 is the first display mode (the live view image & the GUI screen) based on the setting information of the display mode stored in the first working memory 307 in step S420 which will be described later. The first control unit 310 advances the processing to step S406 when the first control unit 310 determines that the display mode of the tablet device 101 is the first display mode (the live view image & the GUI screen), and otherwise the first control unit 310 advances the processing to step S409.

In step S406, the first control unit 310 compresses the live view images read from the first working memory 307 by the codec 308. By performing the compression processing in this manner, it is possible to reduce the communication bandwidth occupied when a live view image is transmitted.

In step S407, the first controller 310 compresses the GUI screen data read from the second working memory 316 by the codec 308.

In step S408, the first control unit 310 transmits the live view image data and the GUI screen data compressed in steps S407 and S408 to the tablet device 101 via the wireless communication unit 312 by the communication control unit 311.

When the user selects the first display mode in the tablet device 101 by the processing from step S405 to step S408, data of the images or the GUI screen corresponding to the first display mode can be transmitted to the tablet device 101.

In step S409, the first control unit 310 determines whether or not the display mode of the tablet device 101 is the third display mode. The first control unit 310 advances the processing to step S410 when the first control unit 310 determines that the display mode of the tablet device 101 is the third display mode, and otherwise the first control unit 310 advances the processing to step S415.

In step S410, the first control unit 310 compresses the live view images read from the first working memory 307 by the codec 308. Note that the processing of compressing the composite image in which the OSD screen is superimposed on the live view image is performed, thereby the processing of step S410 and the processing of step S411 can be replaced.

In step S411, the first control unit 310 compresses the OSD screen read from the first working memory 307 using the codec 308.

In step S412, the first control unit 310 causes the communication control unit 311 to transmit the live view image and the OSD compressed in steps S410 and S411 to the tablet device 101 via the wireless communication unit 312. In step S410, when the composite image in which the OSD screen is superimposed on the live view image is compressed, the composite image is to be transmitted.

When the user selects the third display mode in the tablet device 101 by the processing from step S409 to step S412, data of the image or the OSD screen corresponding to the third display mode can be transmitted to the tablet device 101.

In step S413, the first control unit 310 determines whether or not the operation events of the operation units 703 and 705 of the OSD screen have been received from the tablet device 101. When the first control unit 310 determines that the operation events of the operation units 703 and 705 of the OSD screen have been received from the tablet device 101, the first control unit 310 advances the processing to step S414, and otherwise the first control unit 310 advances the processing to step S419.

In step S414, the first control unit 310 generates a state transition event from the operation event of the OSD screen received in step S413.

In step S415, the first control unit 310 compresses the GUI screen read from the second working memory 316 using the codec 308.

In step S416, the first control unit 310 transmits the GUI screen compressed in step S415 to the tablet device 101 via the wireless communication unit 312 by the communication control unit 311.

In step S417, the first control unit 310 determines whether or not operation events of the operation units 702 and 703 of the GUI screen have been received from the tablet device 101. When the first control unit 310 determines that the operation events of the operation units 702 and 703 of the GUI screen have been received from the tablet device 101, the first control unit 310 advances the processing to step S418, and otherwise the first control unit 310 advances the processing to step S419.

In step S418, the first control unit 310 notifies the second control unit 318 of the operation event of the GUI screen received in step S417.

According to the above-described processing, when the first display mode is selected in the tablet device 101, the image including the live view image, the GUI screen, and the operation units can be displayed on the tablet device 101. When the second display mode is selected on the tablet device 101, the GUI screen and the operation unit can be displayed on the tablet device 101. When the third display mode is selected on the tablet device 101, the image including the live view image, the OSD screen, and the operation units can be displayed on the tablet device 101. In this manner, since the tablet device 101 can display the same OSD screen or the same GUI screen as the video camera 100, the user can view the same screen on both the video camera 100 and the tablet device 101.

In step S419, the first control unit 310 determines whether an event for changing the display mode has been received from the tablet device 101. The first control unit 310 advances the processing to step S420 when the first control unit 310 determines that an event for changing the display mode is received from the tablet device 101, and otherwise the first control unit 310 advances the processing to step S421. The display mode change event received by the video camera 100 from the tablet device 101 includes a transmission request for an image or an operation screen which is different for respective display modes. As a result, different images and operation screens can be transmitted for respective display modes, and the tablet device 101 can display the images and the operation screens in an optimal layout according to the images and the operation screens received from the video camera 100.

In step S420, the first control unit 310 performs processing for changing the display mode of the tablet device 101, and stores the setting of the changed display mode in the first working memory 307.

In step S421, the first control unit 310 determines whether other event has been received from the tablet device 101. The other events include for example, events such as changes in a focusing or a zooming other than operation events of the OSD screen and the GUI screen. The first control unit 310 advances the processing to step S422 when the first control unit 310 determines that the other event has been received from the tablet device 101, and otherwise the first control unit 310 terminates the processing.

In step S422, the first control unit 310 performs processing for generating the other event, and returns the processing to step S401.

According to the above-described processing, the video camera 100 transmits the OSD screen and the GUI screen to the tablet device 101 in accordance with the display mode of the tablet device 101, and the tablet device 101 can selectively display the OSD screen and the GUI screen for respective display modes. In addition, the video camera 100 transmits to the tablet device 101 the live view image, the OSD screen, the GUI screen, and the display layout information of the operation units when displaying them on the tablet device 101. Therefore, the tablet device 101 does not need to store these information in advance. In addition, in terms of development, it is not necessary to individually implement the screens such as the OSD screen, the GUI screen, the menu screens corresponding to the OSD screen or the GUI screen of the video camera 100 on the tablet device 101, so that the development man-hour can be shortened.

FIG. 5 is a flowchart illustrating operations of the second control unit 318 of the video camera 100.

In step S501, the second control unit 318 receives from the first control unit 310 the information relating to the GUI screen displayed on the second display unit 202, the GUI screen is transferred via the DMA controller 323 in step S304 of FIG. 3.

In step S502, the second control unit 318 generates the GUI screen by the second screen generation unit 322 based on the information on the GUI screen received in step S501 and renders the GUI screen to the VRAM of the second working memory 316.

In step S503, the second control unit 318 outputs the GUI screen data to the second display unit 202.

In step S504, the second control unit 318 determines whether or not the GUI screen has been operated. The second control unit 318 advances the processing to step S506 when the second control unit 318 determines that the GUI screen has been operated, and otherwise the second control unit 318 advances the processing to step S505 when the GUI screen has not been operated.

In step S505, the second control unit 318 determines whether or not the operation events of the operation units 702 and 703 of the GUI screen have been received from the first control unit 310 in step S418 of FIG. 4B. When the second control unit 318 determines in step S418 of FIG. 4B that the operation events of the operation units 702 and 703 of the GUI screen have been received from the first control unit 310, the second control unit 318 advances the processing to step S506, and otherwise the second control unit 318 advances the processing to step S507.

In step S506, the second control unit 318 generates a state transition event based on the operation detected in step S504 or the operation event received in step S505.

In step S507, the second control unit 318 determines whether or not the state transition event has occurred in step S505 or S506. The second control unit 318 advances the processing to step S508 when the second control unit 318 determines in step S505 or S506 that the state transition event has occurred, and otherwise the second control unit 318 returns the processing to step S501.

In step S508, the second control unit 318 transmits the state transition event to the first control unit 310 via the DMA controller 323.

Next, with reference to FIGS. 6A and 6B, the operation of the tablet device 101 will be described.

In step S601, the fourth control unit 411 determines whether or not the communication with the video camera 100 is established. The fourth control unit 411 advances the processing to step S602 when the fourth control unit 411 determines that communication with the video camera 100 is established, and otherwise the fourth control unit 411 returns the processing to step S601.

In step S602, the fourth control unit 411 determines whether or not the WEB application has been received from the video camera 100. The fourth control unit 411 advances the processing to step S604 when the fourth control unit 411 determines that the WEB application has been received from the video camera 100, and otherwise the fourth control unit 411 advances the processing to step S603.

In step S603, the fourth control unit 411 receives the WEB application transmitted from the video camera 100 in step S403 of FIG. 4A via the antenna 410 by the wireless communication unit 409. The WEB application received in step S603 includes information relating to the live view images, the OSD screen, the GUI screen, the operation units, and the display layout thereof for respective display modes of the tablet device 101.

In step S604, the fourth control unit 411 receives the status information of the video camera 100 transmitted from the video camera 100 in step S404 of FIG. 4A via the antenna 410 by the wireless communication unit 409.

In step S605, the fourth control unit 411 determines whether or not the display mode of the tablet device 101 is the first display mode (the live view image & the GUI screen). The fourth control unit 411 advances the processing to step S606 when the fourth control unit 411 determines that the display mode of the tablet device 101 is the first display mode (the live view image & the GUI screen), and otherwise the fourth control unit 411 advances the processing to step S610.

In step S606, the fourth control unit 411 receives live view image data and GUI screen data transmitted from the video camera 100 at step S408 of FIG. 4A via the antenna 410 by the wireless communication unit 409.

In step S607, the fourth control unit 411 displays the operation units 702 and 703 of the GUI screen on the fourth display unit 408 in the display layout of the first display mode shown in FIG. 7A.

In step S608, the fourth control unit 411 displays the live view image on the fourth display unit 408.

In step S609, the fourth control unit 411 displays the GUI screen on the fourth display unit 408. Note that since the GUI screen in FIG. 7A is displayed alone without being superimposed on the other image such as the live view image, the GUI screen is more suitable for displaying information.

According to the processing of steps S607 to S609, the live view image, the GUI screen, and the operation units corresponding to the display modes selected by the user on the tablet device 101 can be displayed.

In step S610, the fourth control unit 411 determines whether or not the display mode of the tablet device 101 is the third display mode (the live view image & the OSD screen). The fourth control unit 411 advances the processing to step S611 when the fourth control unit 411 determines that the display mode of the tablet device 101 is the third display mode (the live view image & the OSD screen), and otherwise the fourth control unit 411 advances the processing to step S618.

In step S611, the fourth control unit 411 receives the live view image data and the OSD screen data transmitted from the video camera 100 in step S412 of FIG. 4B via the antenna 410 by the wireless communication unit 409.

Figure 7C:
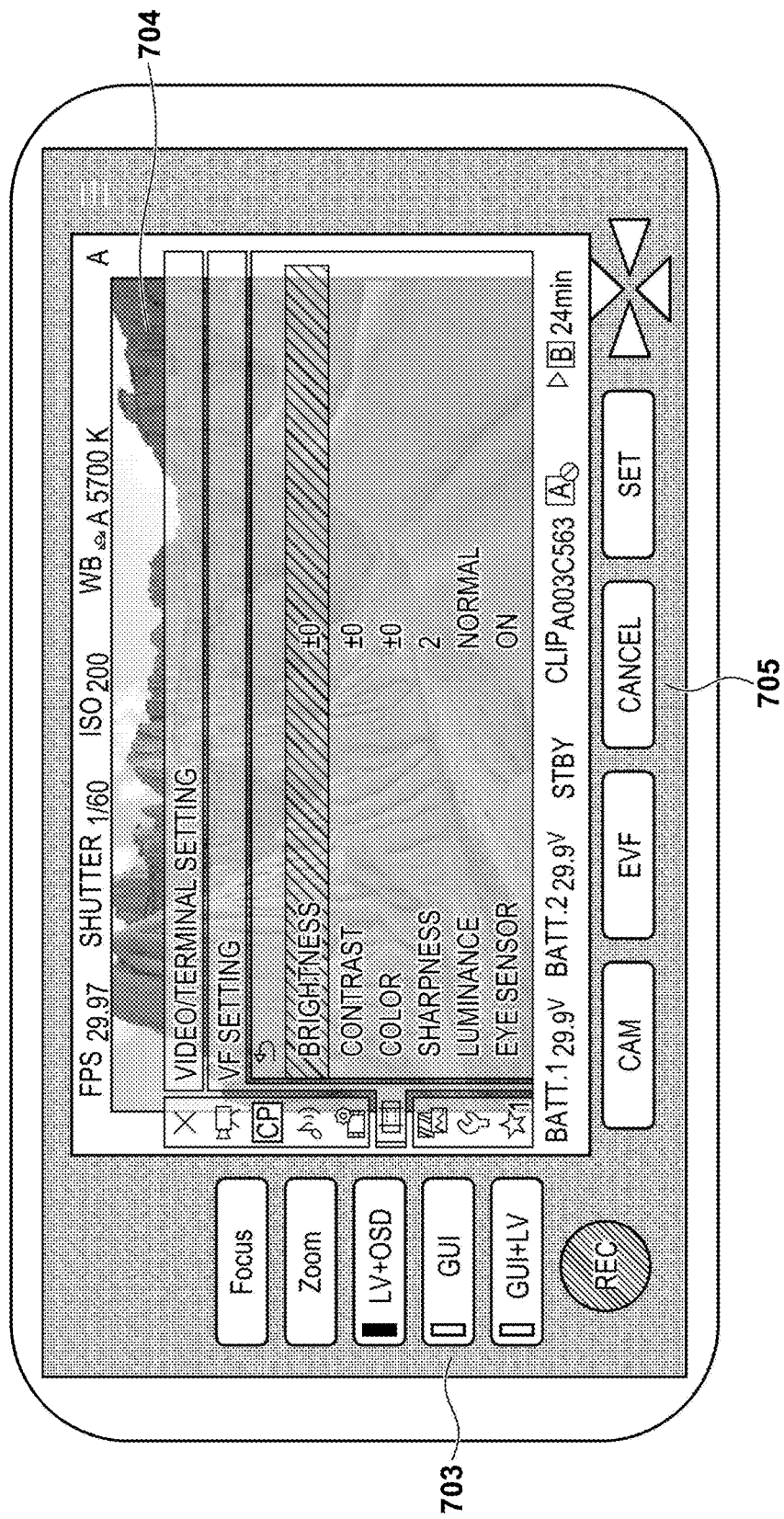

In step S612, the fourth control unit 411 displays the operation units 703 and 705 of the OSD screen on the fourth display unit 408 in the display layout of the third display mode shown in FIG. 7C.

In step S613, the fourth control unit 411 displays the live view images on the fourth display unit 408.

In step S614, the fourth control unit 411 determines whether or not the display function of the OSD screen is set to be ON (enabled). When the fourth control unit 411 determines that the display function of the OSD screen is set to be ON (enabled), the fourth control unit 411 advances the processing to step S615, and otherwise the fourth control unit 411 advances the processing to step S616.

In step S615, the fourth control unit 411 displays the OSD screen on the fourth display unit 408. Since the OSD screen in FIG. 7B is superimposed and displayed on the live view image, the OSD screen is optimal layout for satisfying both of the viewing of the live view image and the checking of the menu and/or the state of the video camera 100.

The processing of steps S613 to S615 allows the tablet device 101 to display the live view image, the GUI screen, and the operation units in accordance with the display mode selected by the user.

In step S616, the fourth control unit 411 determines whether or not the operation units 703 and 705 of the OSD screen have been operated. The fourth control unit 411 advances the processing to step S617 when the fourth control unit 411 determines that the operation units 703 and 705 of the OSD screen have been operated, and otherwise the fourth control unit 411 advances the processing to step S623.

In step S617, the fourth control unit 411 transmits the operation events of the OSD screen detected in step S616 to the video camera 100 via the antennas 410 via the wireless communication unit 409.

In step S618, the fourth control unit 411 receives the GUI screen data transmitted from the video camera 100 in step S416 of FIG. 4A via the antenna 410 by the wireless communication unit 409.

In step S619, the fourth control unit 411 displays the operation units 702 and 703 of the GUI screen on the fourth display unit 408 in the display layout of the second display mode shown in FIG. 77B.

In step S620, the fourth control unit 411 displays the GUI screen on the fourth display unit 408.

According to the processing of step S620, it is possible to display the GUI screen and the operation units corresponding to the display modes selected by the user on the tablet device 101.

In step S621, the fourth control unit 411 determines whether or not the operation units 702 and 703 of the GUI screen have been operated. The fourth control unit 411 advances the processing to step S622 when the fourth control unit 411 determines that the operation units 702 and 703 of the GUI screen have been operated, and otherwise the fourth control unit 411 advances the processing to step S623.

In step S622, the fourth control unit 411 transmits the operation event of the GUI screen detected in step S621 to the video camera 100 via the antennas 410 via the wireless communication unit 409.

In step S623, the fourth control unit 411 determines whether or not the tablet device 101 has been operated to change the display mode. The fourth control unit 411 advances the processing to step S624 when the fourth control unit 411 determines that an operation for changing the display mode of the tablet device 101 has been made, and otherwise the fourth control unit 411 advances the processing to step S625. In the present embodiment, three modes of the first display mode (live view image & the GUI screen), the second display mode (GUI screen), and the third display mode (the live view image & the OSD screen) are assumed, but the display mode may be switched under other conditions. For example, the live view image and the OSD screen may be displayed as a mode for displaying a large live view image, the live view image and the GUI screen may be displayed in a mode for displaying a small live view image, and the GUI screen may be displayed in a non-display mode for a live view image.

In step S624, the fourth control unit 411 transmits the display mode change event of the tablet device 101 to the video camera 100 via the antenna 410 by the wireless communication unit 409. The video camera 100 determines that the display mode change event has been received from the tablet device 101 in step S419 of FIG. 4B.

In step S625, the fourth control unit 411 determines whether or not other operations have been made. The other operations include for example, operations such as changes in a focusing or a zooming other than the operation of the OSD screen or the GUI screen. The fourth control unit 411 advances the processing to step S626 when the fourth control unit 411 determines that the other operations have been made, and otherwise the fourth control unit 411 returns the processing to step S602.

In step S626, the fourth control unit 411 via the antenna 410 by the wireless communication unit 409 transmits the other operation event to the video camera 100.

According to the present embodiment, when different operation screens or operation units are provided for respective display units such as the video camera 100, the user can selectively display different operation screens and operation units on the tablet device 101.

When the user selects a mode for displaying both the live view image and the OSD screen, the tablet device 101 can display the live view image, the OSD screen and the operation units. As a result, when the user remotely operates the video camera 100 from the tablet device 101 without an external monitor from a position which is distant from the video camera 100, the user can display and check the live view image in a large size, and can also operate the video camera 100.

Further, when the user selects a mode for displaying the GUI screen, the tablet device 101 can display the GUI screen and the operation units. As a result, when the live view image is visible by other monitor or when the assistant performs only the setting operation, the user can more comfortably operate the GUI to perform shooting.

Further, when the user selects a mode for displaying the live view image and the OSD screen, the tablet device 101 can display the live view image, the OSD screen, and the operation members. Thus, when the screen size of the tablet device 101 is large, the user can more comfortably operate the GUI while viewing the live view image.

In addition, the user can view the same screen on both the video camera 100 and the tablet device 101.

In terms of development, since the video camera 100 transmits the live view image, the operation screen, and the display layout information of the operation units to the tablet device 101 when displaying them on the tablet device 101, the tablet device 101 does not need to store these information in advance. In addition, in terms of development, it is not necessary to individually implement the menu screen corresponding to the operation screen of the video camera 100 on the tablet device 101 or the like, so that the development man-hour can be shortened.

The display mode change event which the video camera 100 receives from the tablet device 101 includes a transmission request for an image which is different for respective display modes. As a result, different images and operation screens can be transmitted for respective display modes, and the tablet device 101 can display the images and the operations in an optimal layout according to the image and the operation received from the video camera 100.

Further, since the OSD screen displayed on the tablet device 101 is superimposed on the live view image, the OSD screen is optimal for satisfying both of the viewing of the live view image and the checking of the menu and/or the state of the video camera 100. Further, since the GUI screen displayed on the tablet device 101 is displayed alone without being superimposed on other image such as a live view image, the layout is more suitable for displaying information.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-016890, filed Feb. 4, 2021 which is hereby incorporated by reference herein in its entirety.

What is claimed is:
1. An image capture apparatus which can be remotely controlled by an external apparatus, comprising:
   a communication unit configured to communicate with the external apparatus;
   an image capturing unit configured to generate a captured image;
   a first generation unit configured to generate a first operation screen which displays first information relating to the image capture apparatus and which includes the captured image;
   a second generation unit configured to generate a second operation screen which is different from the first operation screen and displays second information relating to the image capture apparatus and does not include the captured image;
   a first display unit configured to display the first operation screen;
   a second display unit which is different from the first display unit and displays the second operation screen; and
   a control unit configured to control the image capture apparatus based on an operation request for the image capture apparatus received from the external apparatus, wherein the control unit is configured to selectively transmit the first operation screen or the second opera- tion screen to the external apparatus, based on an instruction from the external apparatus.

2. The apparatus according to claim 1, wherein
the instruction includes a display mode of a screen of the external apparatus,
the external apparatus can switch to one of a first display mode for displaying the second operation screen and the captured image, a second display mode for displaying the second operation screen, and a third display mode for displaying the first operation screen, and
the control unit is configured to control so as to transmit the second operation screen and the captured image, the second operation screen, or the first operation screen to the external apparatus in accordance with the display mode of the external apparatus.

3. The apparatus according to claim 2, wherein
the control unit is configured to transmit layout information to the external apparatus.

4. The apparatus according to claim 2, wherein
the control unit is configured to transmit image data obtained by compressing the second operation screen and image data obtained by compressing the captured image to the external apparatus when the external apparatus is in the first display mode, transmit image data obtained by compressing the second operation screen to the external apparatus when the external apparatus is in the second display mode, and transmit composite image data obtained by superimposing the first operation screen on the captured image and compressing the first operation screen superimposed on the capture image to the external apparatus when the external apparatus is in the third display mode.

5. The apparatus according to claim 1, wherein
the first operation screen includes an On Screen Display (OSD) for displaying the first information and an operation unit for operating the OSD, and
the second operation screen includes a Graphical User Interface (GUI) which is different from the OSD and displays the second information and an operation unit for operating the GUI.

6. An operation apparatus capable of remotely controlling an image capture apparatus, comprising:
a communication unit configured to communicate with the image capture apparatus;
wherein the operation apparatus is configured to receive a first operation screen that includes a captured image, or a second operation screen that does not include the captured image, wherein each screen is received from the image capture apparatus based on an instruction of the operation apparatus;
a display unit configured to selectively display the first operation screen which operably displays first information relating to the image capture apparatus or the second operation screen which operably displays second information relating to the image capture apparatus;
an operation unit configured to selectively accept a user operation on the first operation screen or the second operation screen displayed on the display unit; and
a control unit configured to control an operation request for the image capture apparatus according to the operation of the first operation screen or the second operation screen to be transmitted to the image capture apparatus.

7. The apparatus according to claim 6, wherein
the communication unit is further configured to receive the captured image from the image capture apparatus based on the instruction,
the instruction includes a display mode of a screen of the operation apparatus,
the operation apparatus is capable of switching to any of a first display mode for displaying the second operation screen and the captured image, a second display mode for displaying the second operation screen, and a third display mode for displaying the first operation screen, and
the control unit controls the communication unit to receive the second operation screen and the captured image, the second operation screen, or the first operation screen from the image capture apparatus according to the display mode of the operation apparatus.

8. The apparatus according to claim 7, wherein
the control unit is configured to receive layout information when displaying the first operation screen, the second operation screen and the captured image in the operation apparatus from the image capture apparatus.

9. The apparatus according to claim 7, wherein
the control unit is configured to receive image data obtained by compressing the second operation screen and image data obtained by compressing the captured image from the image capture apparatus when the operation apparatus is in the first display mode, receive image data obtained by compressing the second operation screen from the image capture apparatus when the operation apparatus is in the second display mode, and receive composite image data obtained by superimposing the first operation screen on the captured image and compressing the first operation screen from the image capture apparatus when the operation apparatus is in the third display mode.

10. The apparatus according to claim 6, wherein
the first operation screen includes an OSD (On Screen Display) for displaying the first information and an operation unit for operating the OSD, and
the second operation screen includes a GUI (Graphical User Interface) which is different from the OSD and displays the second information and an operation unit for operating the GUI.

11. A method of controlling an image capture apparatus which can be remotely controlled by an external apparatus, wherein the image capture apparatus comprises:
a communication unit configured to communicate with the external apparatus;
an image capturing unit configure to generate a captured image;
a first generation unit configured to generate a first operation screen for displaying first information relating to the image capture apparatus and which includes the captured image;
a second generation unit configured to generate a second operation screen which is different from the first operation screen and displays second information relating to the image capture apparatus and does not include the captured image;
a first display unit configured to display the first operation screen; and
a second display unit which is different from the first display unit and displays the second operation screen,
wherein the method comprises:
controlling the image capture apparatus based on an instruction received from the external apparatus to selectively transmit the first operation screen or the second operation screen to the external apparatus.

12. A method of controlling an operation apparatus capable of remotely controlling an image capture apparatus, wherein the operation apparatus comprises:
a communication unit configured to communicate with the image capture apparatus; and
a display unit,
wherein the method comprises:
selectively receiving a first operation screen that includes a captured image, or a second operation screen that does not include the captured image, wherein each screen is received from the image capture apparatus based on an instruction of the operation apparatus,
selectively displaying the first operation screen which operably displays first information relating to the image capture apparatus or the second operation screen which operably displays second information relating to the image capture apparatus on the display unit;
accepting a user operation on the first operation screen or the second operation screen displayed on the display unit; and
controlling so as to transmit an operation request for the image capture apparatus according to the operation of the first operation screen or the second operation screen to the image capture apparatus.

13. A non-transitory computer-readable storage medium storing a program that causes a computer to execute a method of controlling an image capture apparatus which can be remotely controlled by an external apparatus,
wherein the image capture apparatus comprises:
a communication unit configured to communicate with the external apparatus;
an image capturing unit configure to generate a captured image;
a first generation unit configured to generate a first operation screen for displaying first information relating to the image capture apparatus and which includes the captured image;
a second generation unit configured to generate a second operation screen which is different from the first operation screen and displays second information relating to the image capture apparatus and does not include the captured image;

a first display unit configured to display the first operation screen; and
a second display unit which is different from the first display unit and displays the second operation screen,
wherein the method comprises:
controlling the image capture apparatus to selectively transmit the first operation screen or the second operation screen to the external apparatus, wherein each screen is transmitted from the image capture apparatus to the external apparatus based on an instruction received from the external apparatus.

14. A non-transitory computer-readable storage medium storing a program that causes a computer to execute a method of controlling an operation apparatus capable of remotely controlling an image capture apparatus,
wherein the operation apparatus comprises:
a communication unit configured to communicate with the image capture apparatus; and
a display unit,
wherein the method comprises:
selectively receiving a first operation screen that includes a captured image, or a second operation screen that does not include the captured image, wherein each screen is received from the image capture apparatus based on an instruction of the operation apparatus,
selectively displaying the first operation screen which operably displays first information relating to the image capture apparatus or the second operation screen which operably displays second information relating to the image capture apparatus on the display unit;
accepting a user operation on the first operation screen or the second operation screen displayed on the display unit; and
controlling so as to transmit an operation request for the image capture apparatus according to the operation of the first operation screen or the second operation screen to the image capture apparatus.

\* \* \* \* \*